United States Patent [19]
Shedrow

[11] 3,787,113
[45] Jan. 22, 1974

[54] EYEGLASSES, AND MOUNTING MEANS THEREFOR

[76] Inventor: Sidney Shedrow, 202 E. Gaston St., Savannah, Ga. 31401

[22] Filed: Sept. 20, 1972

[21] Appl. No.: 290,713

[52] U.S. Cl. ............... 351/43, 2/14 B, 2/14 C, 351/47, 351/57, 351/158
[51] Int. Cl. ........ G02c 9/02, G02c 9/04, G02c 7/08
[58] Field of Search ....... 351/41, 43, 47, 48, 57, 58, 351/158; 2/14 B, 14 C

[56] References Cited
UNITED STATES PATENTS

| | | | |
|---|---|---|---|
| 3,051,957 | 9/1962 | Chan | 351/43 X |
| 3,146,295 | 8/1964 | Roland | 351/158 X |
| 2,905,172 | 9/1959 | Rodenhouse | 351/158 X |
| 2,396,207 | 3/1946 | Schutz et al. | 351/158 |

Primary Examiner—Paul A. Sacher
Attorney, Agent, or Firm—Harold D. Jones, Jr. et al.; James B. Middleton

[57] ABSTRACT

Mounting means for mounting a pair of visually corrective eyeglasses within a protective mask including an attaching means fixed to the viewing glass of the protective mask, the attaching means having a plurality of notches in its lower edge, a carrier having a plurality of tabs to be received within the notches to fix the carrier to the attaching means, the eyeglasses being pivotally carried by the carrier. The arrangement is such that the eyeglasses, with the carrier, are removable from the attaching means; and, when the eyeglasses are in place within the mask, the mask itself locates the eyeglasses with respect to the wearer's eyes.

6 Claims, 5 Drawing Figures

PATENTED JAN 22 1974  3,787,113

EYEGLASSES, AND MOUNTING MEANS THEREFOR

BACKGROUND OF THE INVENTION

This invention relates generally to eyeglasses, and is more particularly concerned with means for mounting optically corrective lenses within a mask or the like.

There are numerous occasions on which it is either desirable or necessary for a person to wear some form of protective mask having a substantially transparent window or viewing glass. Such masks are common, for example, in work areas where there is a hazard of excessive dust, sparks or the like as in the grinding of metal, and such masks are very common to enable a person to see clearly under water.

Protective masks of many varieties are well known in the prior art, and most serve their function of protecting the eyes of the wearer rather well; however, many of these masks cannot be used over, or in addition to, a pair of eyeglasses worn for visual correction. This is especially true of a mask to be worn under water because the temple pieces that normally secure the eyeglasses extend past the seal of the mask so that the mask continuously fills with water.

It has been determined that approximately 70 percent of the population have some form and degree of ametropia, which presents an extensive problem in the use of various protecting masks. In the case of the person in a hazardous work area, the solution to the problem has usually taken the form of unbreakable lenses, ground to a specific wearer's required optical prescription, permanently mounted in a pair of goggles or the like. While this may provide a workable solution, it has the disadvantage of allowing only one person to wear the particular goggles. In the case of the person working under water, the usual solution is simply to dispense with the optical correction, which severely diminishes the person's ability while under water. There have also been attempts at providing the required corrective lenses integrally with the transparent face plate or viewing glass of a mask, but such an arrangement necessitates the change of the entire glass to change the optical prescription. Also, such an arrangement provides an area of distortion where the corrective lenses merge with the flat viewing glass.

An apparent solution to all of the foregoing problems is the use of contact lenses, but it has been found that a wearer experiences considerable discomfort when wearing contact lenses under a confining mask. Further, if the contact lenses slip from their proper location, as they are wont to do, it is extremely difficult to reposition them.

SUMMARY OF THE INVENTION

The device of the present invention overcomes the above mentioned and other difficulties with the prior art solutions to the problem of providing visually corrective lenses in conjunction with a mask by providing an attaching means that is permanently fixable to the viewing glass of a mask in a position that will not obstruct vision in normal use of the mask. A pair of eyeglasses is provided with a pivotal carrier, the carrier being adapted to be received by the attaching means so that the eyeglasses are held in place with respect to the viewing glass of the mask. Since the conventional mask is adapted to be fixed in place with respect to the head of a wearer, the eyeglasses will be properly positioned in front of the wearer's eyes without additional supporting means to bear against the wearer's face or other parts of the anatomy. The pivotal relationship between the eyeglasses per se and the carrier allows easier manipulation to connect the carrier to the attaching means, and allows proper adjustment of the eyeglasses with respect to the eyes of the wearer for proper pantoscopicity.

These and other features and advantages of the present invention will become apparent from consideration of the following specification when taken in conjunction with the accompanying drawings.

DESCRIPTION OF A PREFERRED EMBODIMENT

Figure 1:
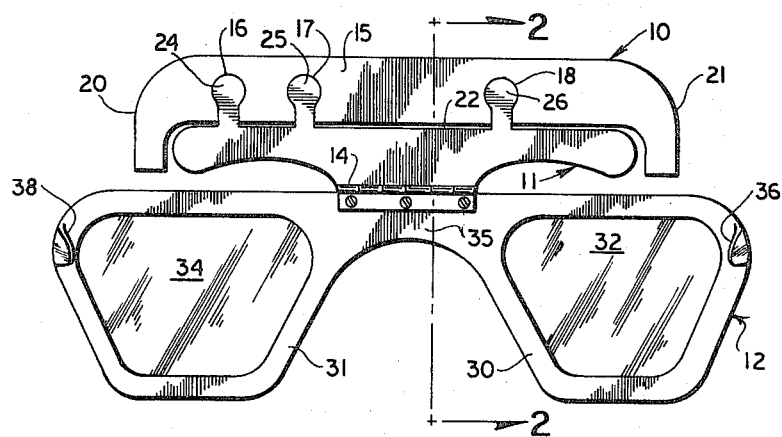
FIG. 1 is a front elevational view of a pair of eyeglasses and the carrier therefor made in accordance with the present invention.
Figures 2, 4, 5:
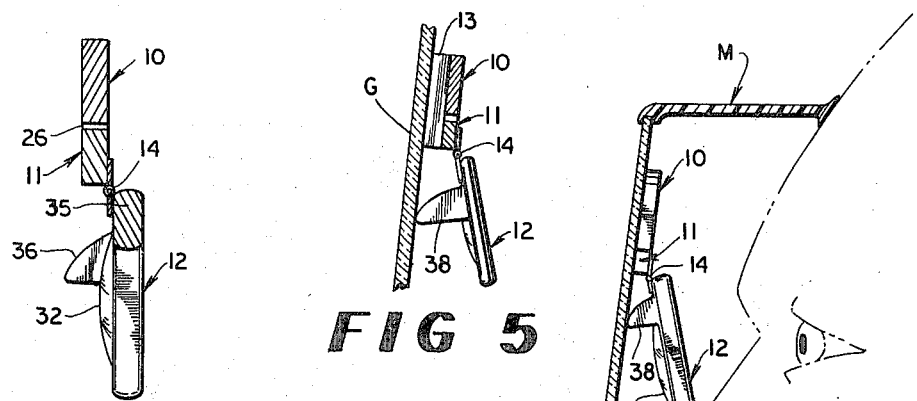
FIG. 2 is a cross-sectional view taken substantially along the line 2—2 of FIG. 1.
FIG. 4 is a side elevational view of the device of FIG. 3 in place on a wearer, the mask being partially broken away; and, FIG. 5 is a side elevational view of the device having an adapter.

Referring now more particularly to the drawings and to that embodiment of the invention here chosen by way of illustration, the device shown in FIGS. 1 and 2 includes the attaching means 10 having the carrier 11 fixed thereto, and the eyeglasses 12 pivotal on the carrier 11 by means of a hinge 14.

At this point it should be understood that the word eyeglasses is used in its broad sense as including only lenses and a frame to contain the lenses, but not including any appendages by which the lenses are positioned with respect to a person's eyes. The word should be understood in this sense wherever used herein.

Returning now to FIG. 1, it will be seen that the attaching means 10 comprises a straight bar 15 having a plurality of notches 16, 17 and 18. There is an indicium 19 to indicate the center of the bar 15 (FIG. 3); and, the notch 18 is on one side of the center 19 while the notches 16 and 17 are on the opposite side of the center 19. The purpose of this arrangement will become apparent later. The ends 20 and 21 are turned down so that the carrier 11 somewhat nestles against the attaching means 10. This feature gives the assembly a compact appearance, and aids in the alignment of the carrier with the bar 15.

The carrier 11 is of substantially the same thickness as the attaching means 10, and is preferably of such width as to nestle within the attaching means 10 as previously described. The carrier 11 has a straight edge 22 having a plurality of tabs 24, 25 and 26 extending therefrom, the tabs 24, 25, and 26 being complementary to the notches 16, 17, and 18 respectively and the spacing between the tabs on the carrier 11 is the same as the spacing between the notches on the bar 15.

While no exact shape of tabs and notches is necessary, the object of the arrangement is to provide an interlocking means by which the carrier 11 can be held to the attaching means 10, and this requires a constricted neck portion and an enlarged extending end on the tab. As previously stated, the notches are complementary to the tabs. Thus, the carrier 11 can move towards and away from the attaching means 10 as long as the two are in parallel, co-planar relationship but the two cannot move relative to each other in any other direction.

The eyeglasses 12 include a pair of lens frames 30 and 31 adapted in conventional manner to receive lenses 32 and 34. The two frames 30 and 31 are connected by a bridge 35 to which is fixed the hinge 14. Looking at FIG. 2 of the drawings it will be seen that the hinge 14 has one leaf fixed to the carrier 11, and mounted flush with the rear surface thereof, while the opposite leaf is fixed to the bridge 35 and mounted flush with the front thereof. This provides a slight offset to space the eyeglasses 12 slightly rearward of the viewing glass of the mask.

Projecting forward from the eyeglasses 12, there is a pair of tips 36 and 38. The tips 36 and 38 are here shown as projections from the lateral extremities of the frames 30 and 31 though they may be equally well provided elsewhere on the frames. As is seen in FIG. 2 of the drawings, the tip 38 is long enough to extend past the carrier 11 when the eyeglasses 12 are mounted on the attaching means 10.

Figure 3:
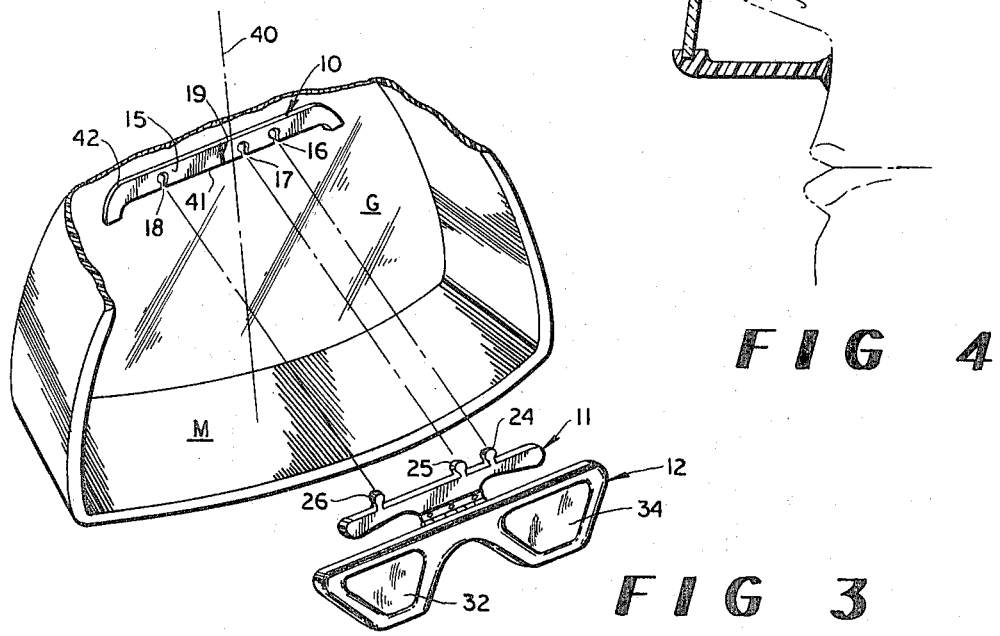
FIG. 3 is an exploded view showing the eyeglasses with their carrier removed from the attaching means, which is mounted on a mask viewing glass.

For an understanding of the mounting and use of the apparatus of the present invention, attention is directed primarily to FIGS. 3 and 4 of the drawings.

First, the viewing glass G of the mask M should be marked with a crayon or the like to indicate the vertical centerline 40; then, a perpendicular should be constructed at the upper portion of the viewing glass G. This perpendicular will be the means for aligning the attaching means 10 with the mask M. The lower edge 41 of the attaching means 10 should be aligned with the perpendicular, and the indicium 19 should be aligned with the centerline 40. In this position, the attaching means 10 should be fixed to the glass G by an appropriate adhesive such as an epoxy glue.

If the attaching means 10 is to be made for a particular mask, it may be desirable to form the upper edge 42 of the attaching means 10 to match the curvature of the mask M. By this arrangement, the centerline 40 can be constructed, but the upper edge 42 will be placed contiguously with the border of the viewing glass instead of using the perpendicular.

It will now be seen that, with the attaching means 10 in place on the glass G, the mask M can be used normally without noticeable interference from the attaching means 10; thus, one who needs no corrective lenses can use the mask. For the person who does need corrective lenses, however, the eyeglasses 12 having lenses 32 and 34 of the needed prescription can be placed in the mask M. The carrier 11 is simply aligned with the attaching means 10 so that the tabs 24, 25, and 26 are received within the notches 16, 17, and 18 respectively. Due to the spatial relationship of the tabs and notches, the carrier 11 cannot be attached to the attaching means 10 unless the physical orientation of the carrier 11 is proper. It will be obvious also that different shapes of tabs can be used to provide this same feature; e.g., a single asymmetrical tab can be used.

Now, looking at FIG. 4 of the drawings, it will be seen that, when the carrier 11 is in place, carrying the eyeglasses 12, the tips 36 and 38 will contact the viewing glass G and cause the eyeglasses 12 to pivot rearwardly. Those skilled in the art will realize that lenses are disposed at an angle to the vertical for proper placement in front of the eyes. The provision of the tips 36 and 38 renders the angular disposition automatic for the individual. The tips should cause an angle of about 45° with the glass G, and if the angle is too great for the wearer, the tips 36 and 38 can be cut down by filing or the like to achieve the proper angle.

For some physiognomies it may be necessary to move the eyeglasses farther from the viewing glass G. It will be realized that some people have a forehead that is substantially vertical rather than somewhat receding, as is normal. Since the eyeglasses 12 are positioned with respect to the eyes of a wearer by means of the mask M, if the mask M causes the viewing glass G to be moved away from the eyes, the eyeglasses 12 will also be moved away from the eyes.

Corrective lenses are usually ground assuming that the lenses will be placed about 13 to 15 millimeters from the eyes; therefore, a person with an unusual physiognomy may have some distortion with the arrangement thus far described.

To correct this possible distortion, a spacer 13 can be used. This is shown in FIG. 5 of the drawings and includes simply a piece of material to be placed between the attaching means 10 and the viewing glass G. This simple expedient will move the eyeglasses 12 towards the eyes of the wearer to achieve the desired 13 to 15 mm spacing. It will of course be understood that the tips 36 and 38 would be long enough to adjust the pantoscopicity even when the spacer 13 is used.

It will thus be seen that the present invention provides a very simple, yet very effective and comfortable means for disposing optically corrective lenses within a mask. The lenses can be removed at any time so the mask can be used without corrective lenses, or so the lenses can be changed for use by another person.

The particular embodiment of the invention here presented is by way of illustration only, and is meant to be in no way restrictive; therefore, numerous changes can be made, and the full use of equivalents resorted to without departing from the scope of the invention as defined by the appended claims.

I claim:

1. A mask having a viewing glass, and mounting means for mounting a pair of eyeglasses within said mask, said mounting means including attaching means fixable to said viewing glass, a substantially rigid carrier releasibly receivable by said attaching means, and hinge means, said hinge means being fixed to said carrier and to said eyeglasses so that said eyeglasses are pivotal with respect to said carrier said attaching means comprising a bar having a plurality of notches spaced along one edge thereof, a plurality of tabs on said carrier, said tabs being complementary to said notches, said tabs being receivable within said notches.

2. Mounting means according to claim 1, said eyeglasses comprising a pair of lens frames, a pair of lenses mounted within said lens frames, and a bridge between said lens frames, and a plurality of tips on said lens frames, said tips configured to contact said viewing glass to cause said eyeglasses to pivot away from said viewing glass.

3. In combination, a mask to fit over the eyes of a wearer, said mask having a substantially flat viewing glass, and a pair of eyeglasses, attaching means fixed to said viewing glass at the horizontal center of said viewing glass and at the upper vertical periphery of said viewing glass, a substantially rigid carrier for said eyeglasses removably receivable by said attaching means in substantially the same plane as said attaching means, and hinge means, said hinge means being fixed to said eyeglasses and to said carrier so that said eyeglasses are pivotal with respect to said carrier said attaching means comprising a bar having a plurality of notches spaced along one edge thereof, a plurality of tabs on said carrier, said tabs being complementary to said notches, said tabs being receivable within said notches.

4. The combination of claim 3, said hinge means being fixed to the upper portion of said eyeglasses and means for causing said eyeglasses to pivot about said hinge means away from said viewing glass.

5. The combination of claim 5 wherein said mask is an underwater mask, said mask configured to fit against the face of a wearer to effect a water-tight seal.

6. The combination of claim 5 and including spacer means between the said attaching means and the said viewing glass to support said attaching means parallel to said viewing glass and inwardly displaced therefrom.

* * * * *